United States Patent
Ewards et al.

[11] Patent Number: 5,567,337
[45] Date of Patent: Oct. 22, 1996

[54] ELECTRIC ENGINE BLOCK HEATER WITH FLANGED SCREW

[75] Inventors: Gary C. Ewards; William Rose; Ronald H. Schaefer, all of Winnipeg, Canada

[73] Assignee: Phillips & Temro Industries Ltd., Winnipeg, Canada

[21] Appl. No.: 249,635

[22] Filed: May 26, 1994

[51] Int. Cl.$^6$ .................................................. B60L 1/02
[52] U.S. Cl. ........................... 219/205; 29/512; 219/208
[58] Field of Search ....................... 29/512, 523; 411/501, 411/271, 325, 925, 938, 954, 397; 219/205, 206, 207, 208

[56] References Cited

U.S. PATENT DOCUMENTS

| | | | |
|---|---|---|---|
| 703,504 | 7/1902 | Turk | 411/954 |
| 936,549 | 10/1909 | Lundholm | 411/954 |
| 1,052,679 | 2/1913 | MacDonald | 411/954 |
| 1,609,597 | 12/1926 | Arnt | 29/512 |
| 2,357,748 | 9/1944 | Lyon | 29/512 |
| 2,405,897 | 8/1946 | Milone et al. | 411/501 |
| 3,157,773 | 11/1964 | Pickard | 219/208 |
| 3,587,548 | 6/1971 | Wernicke | 219/208 |
| 3,646,314 | 2/1972 | Windsor | 219/208 |
| 3,766,356 | 10/1973 | Feldmann | 219/208 |
| 3,785,420 | 1/1974 | Bradley et al. | 411/954 |
| 4,242,564 | 12/1980 | Kendall | 219/208 |
| 4,465,039 | 8/1984 | Snelgrove et al. | 219/208 |
| 4,851,640 | 7/1989 | Smith | 219/208 |

FOREIGN PATENT DOCUMENTS

| | | |
|---|---|---|
| 0850767 | 9/1970 | Canada .................. 219/208 |
| 854325 | 10/1970 | Canada . |
| 1095355 | 2/1981 | Canada . |
| 1096918 | 3/1981 | Canada . |
| 1192248 | 8/1985 | Canada . |

Primary Examiner—Teresa J. Walberg
Assistant Examiner—Karl Easthom
Attorney, Agent, or Firm—Harness, Dickey & Pierce, P.L.C.

[57] ABSTRACT

A block heater for the cooling fluid of an engine block has a main body with a surrounding flange at the front face for engaging into an aperture in the block. A clamping element attached to the rear face can be actuated by a screw which is rotated from the front face to pull the clamping element into engagement with the inside surface of the block to cooperate with the flange in a clamping action. The clamping member cooperates with the screw to be pulled forwardly. The rear face of the clamping member has a countersink around the threaded bore therethrough and the screw has a bore in the end face thereof so that a portion of the screw material can be worked into a flange surrounding the end of the screw to engage into the countersink portion. This arrangement prevents reverse rotation of the screw from releasing the clamping member for discharge into the engine compartment.

12 Claims, 2 Drawing Sheets

ELECTRIC ENGINE BLOCK HEATER WITH FLANGED SCREW

BACKGROUND OF THE INVENTION

This invention relates to an engine block heater and particularly to a technique in such a block heater for coupling the clamping screw to the rear clamping member.

Engine block heaters are required for cold climatic conditions and generally comprise a heater body for mounting in an aperture in the wall of the engine block. The aperture is generally circular so that the heater body is similarly circular in front elevation with a front face for facing out of the engine block and a rear face for facing inwardly into the engine block. The front face includes a flange for surrounding the aperture and a locating means or rear clamping member is located on the rear face for engaging the inside surface of the wall of the block.

In some embodiments the locating means comprises simply a transverse plate which is rigid and is carried upon a loose screw which extends through an aperture in the heater body so that rotation of the screw by actuation of the head of the screw presented at the front face causes the plate member to be drawn toward the rear face to engage the inside surface of the block in a clamping action.

In other embodiments, the rear locating means comprises a generally V-shaped body with a pair of rearwardly and outwardly diverging legs which commence at a position with a relatively narrow angle of the V and are then pushed outwardly into engagement with the inside surface of the block by a pressure plate which is squeezed against a rear face of the legs by forward movement caused by cooperation with the loose screw.

In both embodiments it is necessary to ensure that reverse rotation of the screw, that is in a direction to move the locating means away from the rear face, does not allow the locating means to be released from the screw and thus dropped into the interior of the engine. The conventional technique which is used to generate the five or six pounds of torque resistance desirable in this arrangement is simply to crimp the last three or four turns of the thread of the screw so that the female screw threads of the locating member cannot pass over the crimped or deformed male threads of the screw.

Examples of block heater designs are shown in U.S. Pat. No. 3,766,356 (Feldmann), and in Canadian patents 1,096,918 (Brinkhof), 1,095,355 (Kendall), 854,325 (Windsor) and 1,192,248 (Brinkhof). None of these patents discuss in any way this necessity to prevent release of the locating member from the screw. However, in the commercial embodiments manufactured as shown in these patents or otherwise, the above described crimping technique is generally used, The crimping technique is simple and inexpensive and is therefore substantially universally used. However, careful analysis of the design by the present inventors has realized that there are a number of disadvantages in use of this technique.

Firstly, the crimping technique necessarily requires that three or four turns of the male thread of the screw remain exposed at the back of the locating member. This necessarily therefore increases the dimensions of the structure since the screw length must be increased to accommodate these additional threads. In some arrangements now necessary for the smaller engines currently being manufactured, it is difficult to accommodate this increased dimension of the block heater.

Secondly, it is necessary to have access to the end turns of the screw to effect the crimping action. This requires the screw to be clamped from two sides and in some designs now desirable this access may be limited or unavailable. Thus in many designs, as shown for example in the above Feldmann patent, the block heater element is formed in a U-shape which is bent at right angles so that a main portion thereof lies parallel to the rear face of the heater body. In arrangements where there is very limited space for the element, it is necessary for the distance between the main portion of the element and the rear face to be considerably reduced. Thus the end of the screw may be located between the legs of the element and thus unavailable for the crimping action.

In a further known technique, a protruding end of the screw is impacted in an axial direction with a pointed impact tool. This impact creates a small indent and attempts to force an end part of the screw radially outwardly and form a bulged section at the end of the screw. This bulged section resists passage of the locating member beyond the end of the screw. There are a number of disadvantages to this technique. Firstly the impact causes high axial loading on the screw which can cause damage to or buckling of the screw. Secondly the screw must still project above the rear surface of the locating member so that it is not possible to form a restriction on the screw which is flush with the rear surface of the locating member. Thirdly the back-off torque is not fully reliable as the amount of deformation is not controlled and hence is not fully consistent.

SUMMARY OF THE INVENTION

It is one object of the present invention, therefore, to provide an improved arrangement for the cooperation between the screw and the locating means which may enable reduced dimensions of the block heater, According to the invention, there is provided a heater for attachment into an aperture in a wall of an engine block, the wall having an inner surface and an outer surface and closing a hollow interior of the block for receiving a cooling fluid of the block, the heater comprising a heater body having a front face for facing outwardly of the block, a rear face for facing inwardly of the block, an edge face means shaped to engage into the aperture, abutment means adjacent the front face for engaging the outer surface of the block, an opening passing through the heater body from the front face to the rear face, a heating element extending from the rear face for projecting into the cooling fluid within the hollow interior of the block, a screw having male screw threads thereon extending through the opening and having a head actuable at the front face of the heater body, the screw being loosely received in the opening for free non-threaded rotation relative to the heater body, locating means having a female threaded bore threadedly engaged on the screw such that rotation of the screw causes the locating means to move toward the rear face for engagement with the inner surface of the block to clamp the wall between the abutment means and the locating means, the screw having an axially extending bore formed in an end face thereof remote from the head and an annular flange surrounding the screw and lying in said end face projecting to a radial extent greater than that of the male threads to engage the locating means to prevent the locating means being released from threaded engagement with the screw.

Preferably the annular flange is formed by cold forming by rotating a forming member relative to the screw.

The locating means has a rear surface thereof facing away from the rear surface of the heater body and preferably the flange is arranged such that the end of the screw is substantially flush with the rear surface of the locating means and preferably said rear surface has a countersink portion surrounding said female threaded bore with said flange received in the countersink portion. This arrangement is preferably obtained by a technique in which the flange is cold formed by a rotating forming member with the rear surface and the countersink portion acting as an anvil.

According to a second aspect of the invention, there is provided a heater for attachment into an aperture in a wall of an engine block, the wall having an inner surface and an outer surface and closing a hollow interior of the block for receiving a cooling fluid of the block, the heater comprising a heater body having a front face for facing outwardly of the block, a rear face for facing inwardly of the block, and edge face means shaped to engage into the aperture, abutment means adjacent the front face for engaging the outer surface of the block, an opening passing through the heater body from the front face to the rear face, a heating element extending from the rear face for projecting into the cooling fluid within the hollow interior of the block, a screw having male screw threads thereon extending through the opening and having a head actuable at the front face of the heater body, the screw being loosely received in the opening for free non-threaded rotation relative to the heater body, locating means having a female threaded bore threadedly engaged on the screw such that rotation of the screw causes the locating means to move toward the rear face for engagement with the inner surface of the block to clamp the wall between the abutment means and the locating means, the screw having an axially extending bore formed in an end face thereof remote from the head and an annular flange surrounding the screw and lying in said end face projecting to a radial extent greater than that of the male threads to engage the locating means to prevent the locating means being released from threaded engagement with the screw, wherein the locating means comprises a clamping member having a center portion journalled on the screw and a pair of legs each arranged at a respective side of the center portion and extending rearwardly and outwardly therefrom and a pressure bar having said female threaded bore therethrough and defining ends thereof in engagement with respective ones of the legs such that movement of the pressure bar toward the rear surface of the heater body causes the legs to be forced outwardly to engage the inner surface of the block.

According to third aspect of the invention there is provided a method of mounting a heater into an aperture in a wall of an engine block, the wall having an inner surface and an outer surface and closing a hollow interior of the block for receiving a cooling fluid of the block, the method comprising: providing a heater body having a front face for facing outwardly of the block, a rear face for facing inwardly of the block, and edge face means shaped to engage into the aperture, abutment means adjacent the front face for engaging the outer surface of the block, an opening passing through the heater body from the front face to the rear face and a heating element extending from the rear face for projecting into the cooling fluid within the hollow interior of the block; providing a screw having male screw threads thereon extending through the opening and having a head actuable at the front face of the heater body; loosely locating the screw in the opening for free non-threaded rotation relative to the heater body; providing locating means having a female threaded bore and threadedly engaging the female threaded bore on the screw such that rotation of the screw causes the locating means to move toward the rear face for engagement with the inner surface of the block to clamp the wall between the abutment means and the locating means; forming an axially extending bore in an end face of the screw remote from the head; rotating a forming member relative to the screw to define an annular flange surrounding the screw, lying in said end face and projecting to a radial extent greater than that of the male threads to engage the locating means to prevent the locating means being released from threaded engagement with the screw and engaging the heater body into the aperture.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 2:
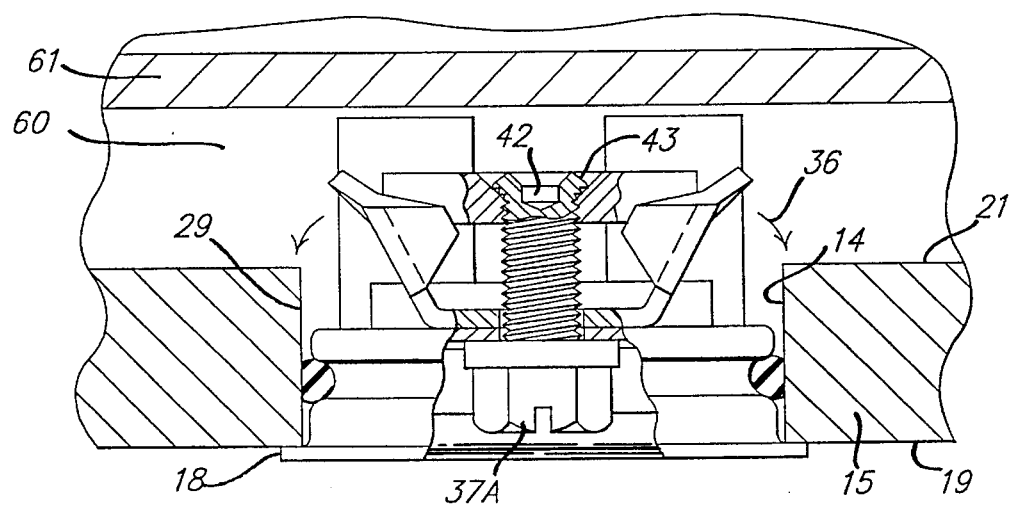
FIG. 2 is a view similar to that of FIG. 1 showing the initial installation of the block heater into an engine block.
Figure 3:
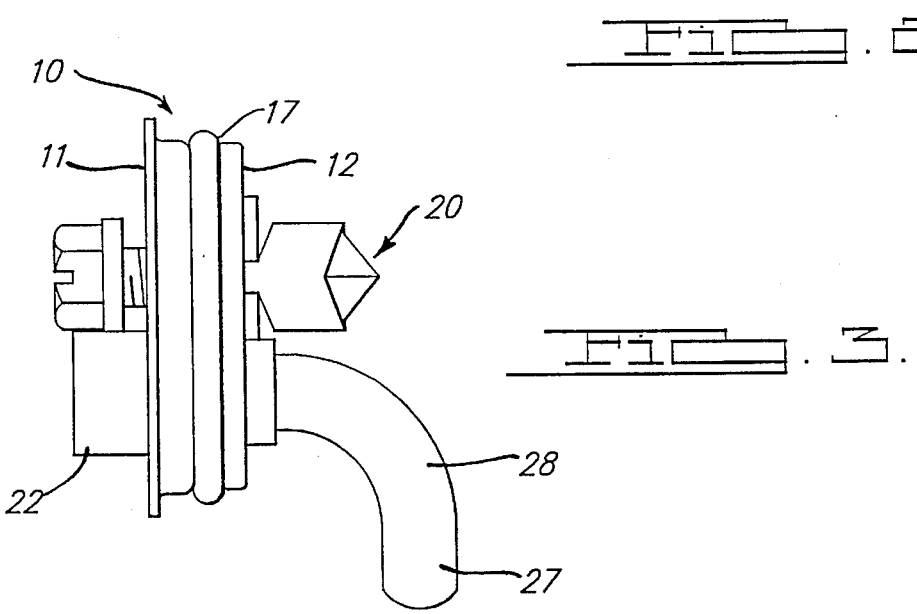
FIG. 3 is a side elevational view of the block heater of FIG. 1.

The main details of the block heater as illustrated are well known to one skilled in the art but will be described herein for completeness. As illustrated in FIG. 3. The heater comprises a main heater body 10 which is formed from pressed stainless steel to form a front face 11 and a rear face 12. Between the front and rear faces is defined an edge 13 (FIG. 4) which surrounds the body and is generally annular in shape so as to be inserted into a circular opening 14 in a wall 15 of an engine block defining an engine side wall 29 as shown in FIG. 2. The edge wall 13 is shaped to define a recess 16 for an O ring 17 FIG. 4 which acts to seal by compression in the aperture 14 against engine side wall 29.

With continued reference to FIG. 2, at the front face 11 is provided an annular flange 18 for engaging an outside surface 19 of the wall 15. In operation, the body is held in place by a clamping action between the flange 18 and a locating or clamping member generally indicated at 20. The locating member 20 engages against an inside surface 21 of the wall 15.

Figure 4:
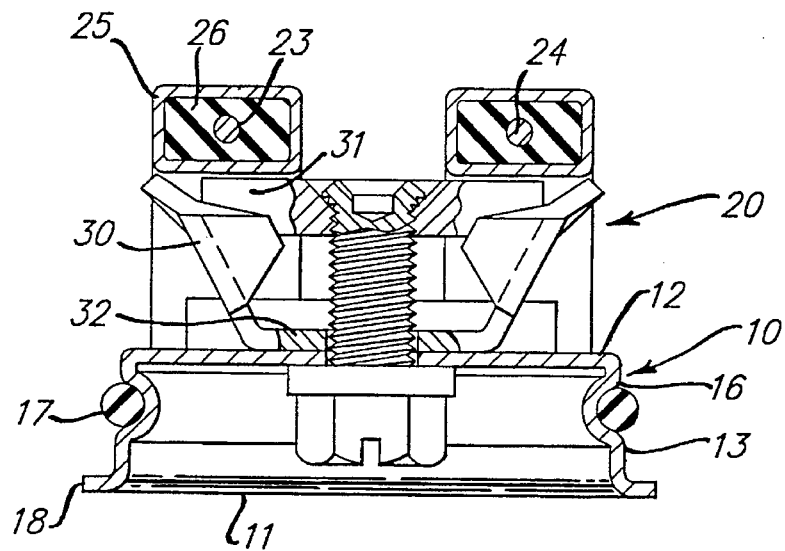
FIG. 4 is a cross sectional view through an alternative arrangement of the block heater.

As seen in FIGS. 3 and 4, the body 10 carries a heating element 28 in the form of a U-shaped loop with ends of the legs of the loop projecting though the rear face 12 into the area within the body. A protective shroud 22 is mounted on the inside of the wall of the body to surround three terminals (not shown). The terminals comprise a ground terminal connected to the body together with two terminals each forming a wire 23, 24 extending through the interior of the heating element. The heating element thus comprises an outside metal protective layer 25 containing an insulating material 26 through which the heating wire 23, 24 extends. The heating element is bent so that the legs project through the body at right angles to the body and then a main portion of the heating element extends at right angles to the end portions of the legs, that is in a direction parallel to the rear face 12. In the embodiment shown in FIG. 3, the main portion 27 extends in a direction away from the locating member 20. In the embodiment shown in FIG. 4, the heating element is bent so that it extends back over the locating member 20.

The locating member 20 comprises a clamping portion 30 and a pressure plate 31 which are formed as two separate elements. The clamping portion 30 is generally V-shaped including a flat base 32 and a pair of legs 33 and 34 which project rearwardly and outwardly from the flat base 32 which is pressed against the rear surface 12. Each of the legs 33 and 34 includes confining side walls 35 which act to restrain or contain the pressure plate 31. The clamping portion 30 is bendable at the junction between the legs and the base plate in response to downward pressure from the pressure plate 31 so as to force the legs outwardly in a direction of the arrows 36 to engage the inside surface 21 of the wall 15. The movement of the pressure plate 31 is effected by a screw 37 which passes through a loose or non-threaded opening 38 in the body 10. The screw 37 carries male screw threads 39 which engage into a female threaded bore 40 in the pressure plate 31. The screw 37 carries a head 37A accessible from the front face of the body so that rotation of the head causes the screw to cooperate with the threaded bore in the pressure plate to pull the pressure plate toward the rear face of the body to actuate the legs into the clamping position.

The above arrangement is generally known from the prior art, The details therefore will be available to one skilled in the art.

Figure 5:
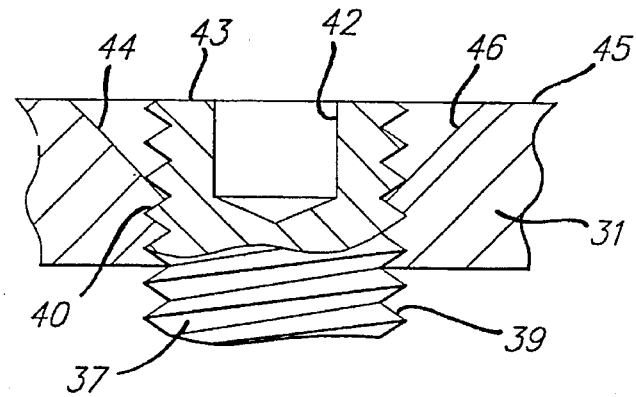
FIG. 5 is an enlarged view of the screw and locating means shown in FIG. 1.
Figure 6:
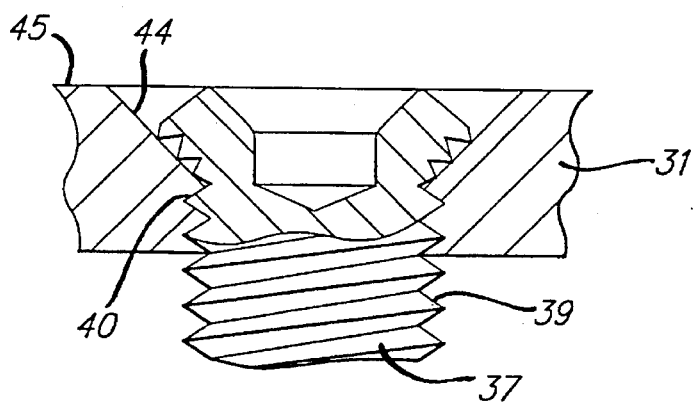
FIG. 6 is an enlarged view of the screw and locating means shown in FIG. 2.

The arrangement as shown is modified by the provision of a cooperating arrangement between the screw and the pressure plate to prevent reverse rotation of the screw from releasing the pressure plate which could then be dropped into the hollow interior of the engine block. In this arrangement the screw includes an end bore 42 which is drilled axially of the screw from an end face 43 of the screw 37 which is opposite to the head 37A. The bore extends only partly along the length of the screw to a distance simply sufficient to effect the modification. In addition, the pressure plate 31 includes a ramp surface 46 (FIG. 5) defining a countersink portion 44 in the rear face 45 thereof surrounding the bore 40.

Figure 1:
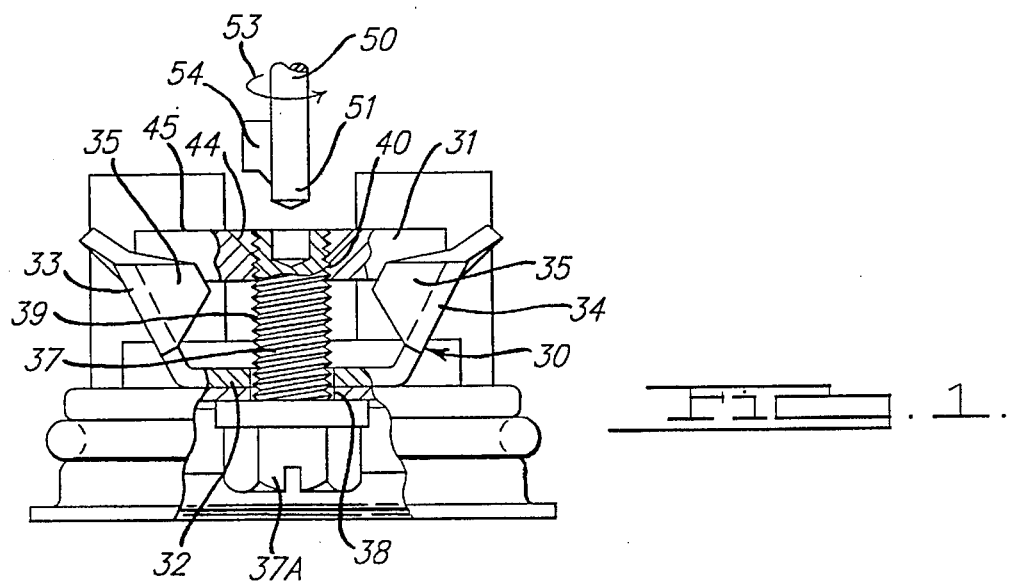
FIG. 1 is a top plan view of a block heater according to the present invention prior to completion of the final step of deforming the screw, showing the screw and part of the pressure bar in cross section and including a schematically illustrated tool for effecting the deformation of the screw.

In assembly the parts are moved to the position shown in FIG. 1 in which the screw is positioned with a short portion thereof projecting outwardly from the end face 45 of the pressure plate. A tool 50 is inserted into the bore 42 in the end face 43, the tool having a cylindrical portion 51 received within the bore and guided thereby in rotation of the tool about a longitudinal axis of the tool as indicated by the arrow 53. The tool includes a projecting portion 54 which extends outwardly from the cylindrical portion 51 to one side thereof and acting as a cold forming member which sweeps around the end portion of the screw. The diameter of the bore relative to the diameter of the screw is arranged so that the end portion of the screw can be folded or turned outwardly by the action of the rotating tool portion 54. Several rotations of the tool about its axis thus cause an end portion of the screw to be swept or turned outwardly into the area defined by the countersink portion 44. The rear face of the pressure plate and the countersink portion act as an anvil for receiving the pressure from the tool and confining the amount of distortion of the material of the screw. Thus the outer wall of the screw is forced into the countersink portion to be in ramp surface 46 and define a flange surrounding the end 43 of the screw. As this portion is deformed outwardly it takes up a radial extent relative to the axis of the screw which is greater than that of the threads of the screw. Once formed, the end of the screw is thus substantially flush with the rear face 45 of the pressure plate. This ensures that there is no portion of the screw extending outwardly beyond the rear face 45 so that in effect the length of the screw can be maintained at an absolute minimum just to hold the pressure plate. During this action the pressure plate is located at a distance from the rear face of the body so that it just engages the legs without forcing the legs outwardly to a distance sufficient to prevent the locating member from being inserted into the block through the aperture 14.

The tool 50 is operated in a direction longitudinal of the screw so that there is no necessity to access the screw from the sides. The tool effects the folding action of the material at the end of the screw by the rotational effect of a number of turns so that there is no necessity for high pressure to be applied to the screw which could cause damage. The appearance of the end of the screw which is recessed within the countersink portion at the rear surface of the pressure plate provides an attractive and professional appearance of the product significantly improved relative to the conventional technique of simply crimping an exposed end portion of the screw.

As shown in FIG. 2 the block heater is in a partially installed position so that the element is located within an interior portion 60 of the engine block. In this arrangement an inner wall 61 of the block defines with the outer wall 15 a jacket within which a coolant liquid is retained. In recent developments in engine technology, the space between the wall 61 and the wall 15 is often very much reduced so that it is necessary to provide a heater of minimum dimensions. This can be achieved by the arrangement of the present invention in which the length of the screw can if necessary be reduced to the absolute minimum in which the pressure plate is abutting the legs and the length of the screw is such that the end face thereof is substantially flush with the rear face of the pressure plate. This allows the heating element to be turned at right angles to take up the position shown in FIG. 3 while retaining the length of the screw and the maximum extent of the locating member from the rear face of the body at a reduced distance relative to the distance of the heating element from the rear face.

In addition, in the arrangement shown in FIG. 4, the positioning of the pressure plate and the length of the screw at the minimum distance from the rear face 12 allows the heating element to be bent back over the locating member while the distance of the heating element from the rear face is again maintained at a minimum. The screw is presented in the space between the heating element legs so that in assembly the tool 50 can be inserted between the heating element legs to effect the action on the end face of the screw.

The flange arrangement turned into the countersink area of the pressure plate provides sufficient reverse torque of the order of six to seven pounds of torque to resist the release of the pressure plate on reverse rotation of the screw. This amount of resistance is sufficient to match required specifications to prevent the pressure plate and also the V-shaped clamping member from being released into the interior 60 of the engine block.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A heater for attachment into an aperture in a wall of an engine block, the wall having an inner surface and an outer surface and closing a hollow interior of the engine block for receiving a cooling fluid of the engine block, the heater comprising a heater body having a front face for facing outwardly of the engine block, a rear face for facing inwardly of the engine block, and edge face means shaped to engage into the aperture, abutment means adjacent the front face for engaging the outer surface of the engine block, an opening passing through the heater body from the front face to the rear face, a heating element extending from the rear face for projecting into the cooling fluid within the hollow interior of the engine block, a screw having male screw threads thereon extending through the opening and having a head actuable at the front face of the heater body, the screw being loosely received in the opening for free non-threaded rotation relative to the heater body, locating means having a female threaded bore and a ramp surface extending therefrom to define a countersink in the locating means, said bore in the locating means being threadedly engaged on the screw such that rotation of the screw causes the locating means to move toward the rear face for engagement with the inner surface of the engine block to clamp the wall between the abutment means and the locating means, the screw having a major longitudinal axis and a tubular terminal portion opposite the head of the screw, said terminal portion having an end face, an outer wall, and an inner wall, said inner wall defining an unobstructed bore, said tubular terminal portion being deformable from a first position to a second position, said first position being defined by the outer wall extending to said end face substantially parallel to the major longitudinal axis of the screw, said second position being defined by the outer wall being bent radially outwardly to form an annular flange lying on the ramp surface of the countersink in the locating means to prevent the locating means from being released from threaded engagement with the screw.

2. The heater according to claim 1 wherein the annular flange is formed by cold forming by rotating a forming member relative to the screw.

3. The heater according to claim 1 wherein the locating means has a rear surface thereof facing away from the rear surface of the heater body, the flange being arranged such that the end of the screw is substantially flush with the rear surface of the locating means.

4. The heater according to claim 3 wherein the flange is cold formed by a rotating forming member with the rear surface and the countersink acting as an anvil.

5. A heater for attachment into an aperture in a wall of an engine block, the wall having an inner surface and an outer surface and closing a hollow interior of the engine block for receiving a cooling fluid of the engine block, the heater comprising a heater body having a front face for facing outwardly of the engine block, a rear face for facing inwardly of the engine block, and edge face means shaped to engage into the aperture, abutment means adjacent the front face for engaging the outer surface of the engine block, an opening passing through the heater body from the front face to the rear face, a heating element extending from the rear face for projecting into the cooling fluid within the hollow interior of the engine block, a screw having male screw threads thereon extending through the opening and having a head actuable at the front face of the heater body, the screw being loosely received in the opening for free non-threaded rotation relative to the heater body, locating means having a female threaded bore threadedly engaged on the screw such that rotation of the screw causes the locating means to move toward the rear face for engagement with the inner surface of the engine block to clamp the wall between the abutment means and the locating means, the locating means having a rear surface facing away from the rear surface of the heater body, said rear surface of the locating means having a countersink portion surrounding said female threaded bore, the screw having a longitudinal axis, a bore formed in an end face thereof remote from the head and extending along said longitudinal axis, and an annular flange surrounding the screw and lying in said end face projecting to a radial extent greater than that of the male threads to engage the locating means to prevent the locating means being released from threaded engagement with the screw, the flange being cold formed by a rotating forming member with the rear surface and the countersink portion acting as an anvil, wherein the locating means comprises a clamping member having a center portion journalled on the screw and a pair of legs each arranged at a respective side of the center portion and extending rearwardly and outwardly therefrom and a pressure plate having said female threaded bore therethrough and defining ends thereof in engagement with respective ones of the legs such that movement of the pressure plate toward the rear surface of the heater body causes the legs to be forced outwardly to engage the inner surface of the engine block.

6. The heater according to claim 5 wherein the flange is arranged such that the end of the screw is substantially flush with the rear surface of the locating means.

7. The heater according to claim 5 wherein the heating element is bent to a direction substantially parallel to the rear face and wherein the end of the screw is spaced from the rear face by a distance less than the spacing of the heater element from the rear face.

8. The heater according to claim 7 wherein the heater element is U-shaped with ends of legs of the U-shape being attached to the rear face and is bent such as a portion thereof extends parallel to the rear face, the screw being mounted on the heater body so as to be located between the legs of the heater element at a position underlying the portion thereof parallel to the rear face.

9. A method of mounting a heater into an aperture in a wall of an engine block, the wall having an inner surface and an outer surface and closing a hollow interior of the block for receiving a cooling fluid of the engine block, the method comprising:

providing a heater body having a front face for facing outwardly of the engine block, a rear face for facing inwardly of the engine block, and edge face means shaped to engage into the aperture, abutment means adjacent the front face for engaging the outer surface of the engine block, an opening passing through the heater body from the front face to the rear face and a heating element extending from the rear face for projecting into the cooling fluid within the hollow interior of the block;

providing a screw having male screw threads thereon extending through the opening and having a head actuable at the front face of the heater body;

loosely locating the screw in the opening for free non-threaded rotation relative to the heater body;

providing locating means having a female threaded bore and a rear surface facing away from the rear surface of the heater body, said rear surface being provided with a countersink portion surrounding said female threaded bore, the female threaded bore threadedly engaging the screw such that rotation of the screw causes the locating means to move toward the rear face for engagement with the inner surface of the engine block to clamp the wall between the abutment means and the locating means;

forming an axially extending bore in an end face of the screw remote from the head;

rotating a forming member relative to the screw with the rear surface of the locating means and the countersink portion acting as an anvil to define an annular flange surrounding the screw and lying in said end face, said flange received in the countersink portion and projecting to a radial extent greater than that of the male threads to engage the locating means to prevent the locating means being released from threaded engagement with the screw;

and engaging the heater body into the aperture.

10. The method according to claim 9 wherein the flange is formed such that the end of the screw and the flange is substantially flush with the rear surface of the locating means.

11. A heater for attachment into an aperture in a wall of an engine block, the wall having an inner surface and an outer surface and closing a hollow interior of the engine block for receiving a cool fluid of the engine block, the heater comprising a heater body having a front face for facing outwardly of the engine block, a rear face for facing inwardly of the engine block, and edge face means shaped to engage into the aperture, abutment means adjacent the front face for engaging the outer surface of the engine block, an opening passing through the heater body from the front face to the rear face, a heating element extending from the rear face for projecting into the cooling fluid within the hollow interior of the engine block, a screw having male screw threads thereon extending through the opening and having a head actuable at the front face of the heater body, the screw being loosely received in the opening for free non-threaded rotation relative to the heater body, locating means having a female threaded bore threadedly engaged on the screw such that rotation of the screw causes the locating means to move toward the rear face for engagement with the inner surface of the engine block to clamp the wall between the abutment means and the locating means, the screw having an axially extending bore formed in an end face thereof remote from the head and an annular flange surrounding the screw and lying in said end face projecting to a radial extent greater than that of the male threads to engage the locating means to prevent the locating means being released from threaded engagement with the screw, said locating means having a rear surface facing away from the rear surface of the heater body, said female threaded bore breaking out on said rear surface and said rear surface having a countersink portion surrounding said female threaded bore with said flange received in the countersink portion, said annular flange formed by cold forming by rotating a forming member relative to the screw with the rear surface and the countersink portion acting as an anvil.

12. The heater according to claim 11 wherein the flange is arranged such that the end of the screw is substantially flush with the rear surface of the locating means.

\* \* \* \* \*